United States Patent

Balukin et al.

Patent Number: 5,787,371
Date of Patent: Jul. 28, 1998

[54] APPARATUS TO ENABLE CONTROLLING A THROTTLE CONTROLLING FROM A REMOTE HOST

[75] Inventors: Gregory S. Balukin; Daniel J. Wolf, both of Pittsburgh, Pa.

[73] Assignee: Westinghouse Air Brake Company, Wilmerding, Pa.

[21] Appl. No.: 920,207

[22] Filed: Aug. 15, 1997

Related U.S. Application Data

[63] Continuation of Ser. No. 340,213, Nov. 16, 1994, abandoned.

[51] Int. Cl.$^6$ .................................................. B61L 3/00
[52] U.S. Cl. ........................... 701/19; 701/20; 701/29; 701/33; 701/35; 246/187 A; 246/187 C
[58] Field of Search .................... 701/19, 20, 29, 701/33, 35; 246/187 A, 187 C, 182 B, 182 C, 191, 167 R; 105/26.05, 61; 340/825.29

[56] References Cited

U.S. PATENT DOCUMENTS

| | | | |
|---|---|---|---|
| 3,696,758 | 10/1972 | Godinez, Jr. | 105/61 |
| 3,699,522 | 10/1972 | Haner, Jr. | 340/825.52 |
| 3,715,579 | 2/1973 | Eblovi | 246/187 A |
| 3,794,834 | 2/1974 | Auer, Jr. et al. | 246/187 B |
| 3,805,056 | 4/1974 | Birkin | 340/996 |
| 4,056,286 | 11/1977 | Burkett | 303/20 |
| 4,553,723 | 11/1985 | Nichols et al. | 246/167 R |
| 4,687,258 | 8/1987 | Astley | 303/3 |
| 4,752,899 | 6/1988 | Newman et al. | 364/550 |
| 4,885,689 | 12/1989 | Kane et al. | 364/424.01 |
| 5,016,840 | 5/1991 | Bezos | 246/187 R |
| 5,039,038 | 8/1991 | Nichols et al. | 246/3 |
| 5,358,202 | 10/1994 | Tse et al. | 246/34 R |
| 5,415,369 | 5/1995 | Hungate | 246/167 R |

*Primary Examiner*—Tan Q. Nguyen
*Attorney, Agent, or Firm*—James Ray & Associates

[57] ABSTRACT

In a locomotive throttle controller having a digital central processor unit and an output driver mechanism for supplying signals to trainlines which control the locomotive engine throttle setting, reverser, and dynamic braking and for sending feedback signals indicative of actual voltages applied to said trainlines back to said central processor unit, of at least one locomotive, an improvement comprises a digital interface through which external digital equipment can communicate with the central processor unit and devices for communicating via the digital interface between the external digital equipment and the central processor unit such that the external digital equipment may be used to control the at least one locomotive.

16 Claims, 3 Drawing Sheets

APPARATUS TO ENABLE CONTROLLING A THROTTLE CONTROLLING FROM A REMOTE HOST

This is a continuation of application Ser. No. 08/340,213, filed Nov. 16, 1994 now abandoned.

FIELD OF THE INVENTION

The present invention relates generally to a throttle controller for a locomotive or other railway transit vehicle, and more particularly to a new and unique electronic apparatus and system that will enable control of the throttle, dynamic brake and reverser from a remote host, that is comparatively low in cost and more intelligent than prior art systems, and compact in volume.

CROSS REFERENCE TO RELATED APPLICATIONS

The invention taught in this patent application is closely related to the inventions taught in the following patents: U.S. Pat. No. 5,564,014 Electronically Controlled Locomotive Throttle Controller Including Remote Multiple Unit Throttle Control; U.S. Pat. No. 5,519,299 Method And Apparatus For Determining And Encoding The Position Of A. Reverser Handle On A Locomotive Control Stand; U.S. Pat. No. 5,537,285 Digital Output Control Device and Method For Operating; U.S. Pat. No. 5,581,472 Method And Apparatus For Feedback Of Trainline Status To The Central Processor Of A Locomotive Throttle Controller; U.S. Pat. No. 5,492,511 Apparatus For Interlocking Throttle, Dynamic Brake And Reverser Handles On A Control Stand Of A Railway Locomotive; U.S. Pat No. 5,563,785 Method Of Performing Diagnostics On An Electronically Controlled Railway Locomotive Throttle Controller; U.S. Pat. No. 5,500,799 Method Of Operating A Locomotive Mounted Throttle Controller Between Two Modes Of Operation Including A Transition Between Such Two Modes; U.S. Pat. No. 5,659,204 An Apparatus For And A Method Of Generating An Analog Signal For Control Of Dynamic Braking; U.S. Pat. No. 5,537,014 An Apparatus For Feedback Of An Analog Signal Used To Monitor And/Or Control Dynamic braking and Method of Operating; U.S. Pat. No. 5,542,891 Apparatus for Interlocking Reverser Handle On A Control Stand Of A Railway Locomotive; and, 08/340,526 (now abandoned) Apparatus For Determining The Absolute Position Of Throttle, Dynamic Brake And Reverser Handles On A Locomotive Control Stand.

Each of the patent applications referenced above is filed concurrently herewith and is assigned to the assignee of this invention. The teachings of all of these patent applications are incorporated herein by reference thereto.

BACKGROUND OF THE INVENTION

In railroad locomotive operations, the throttle, dynamic brake and reverser actions of the locomotive, locomotives or other drive units, are controlled by the operator or engineer in the cab of the lead unit by manipulating three handles extending from the throttle controller stand, one handle each for throttle, dynamic brake, and reverser. The throttle handle, of course, controls the development of the tractive effort of the locomotive; i.e. the diesel engines or other power units. The dynamic brake handle controls the development of a retarding force known as dynamic brake, for example the electric motors driving the locomotive wheels, to place them in either motor mode where they will drive the wheels, or in generator mode, where they will function as a retarding force. The reverser handle controls the forward and reverse rotation of the electric motors to selectively drive the train forward or rearward, and includes a neutral position. Pursuant to current practice, the throttle controller is designed to be a man-to-machine interface and ideally is strictly an electronic/electric device having no direct mechanical, hydraulic or pneumatic connections to the devices controlled. Instead, encoding means are preferably provided within the control stand to read and interpret the positions of the three handles, and convey appropriate signals, indicative of such positions, to an associated microcomputer, namely, a central digital processor. The associated central digital processor is programmed to interpret the encoded signals regarding the positions of the throttle, dynamic brake and reverser handles, as positioned at the throttle controller, and then electronically issue corresponding commands to an output driver to manipulate the devices intended within the locomotive or locomotives. When utilizing a microcomputer, or digital processor, the throttle, dynamic brake and reverser commands effected at the throttle controller, are dependent upon the given angular positions of the three control handles, which are normally sensed and monitored by rotary encoding devices, which are mechanically coupled to associated rotary axles to which the control handles are secured, utilizing cams to actuate microswitches or contacts to provide a signal to the digital processor as noted above.

While apparatus and systems are known in the prior art for controlling throttle, dynamic brake and reverser from a remote location, such systems have been excessively voluminous, normally requiring an entirely separate railway car to house the equipment, and as a result such prior art systems are rather costly, and despite such volume such systems do not have the degree of versatility desired.

SUMMARY OF THE INVENTION

This invention is predicated on the development of a new and improved remote control system that will permit operation of the throttle, dynamic brake and reverser from remote host, whereby the system apparatus is simple and compact in volume, is significantly lower in cost, and has significantly greater capabilities than prior art systems.

A first broad aspect, the present invention provides in a locomotive throttle controller, a digital central processor unit and an output driver for supplying signals to trainlines which control the locomotive's engine throttle setting, reverse, and dynamic braking, and for sending signals indicative of actual measured values of voltages of the trainlines back to the digital central processor, the trainlines functioning in a manner pursuant to conventional practices, and includes a digital interface through which external digital equipment is able to effectively communicate with the central processor unit. There is not only a means for communication both from the external digital equipment to the central processor, but also from the central processor to the external digital equipment.

A person skilled in the art will recognize that the trainlines cited above are the industry standard locomotive trainlines which control the locomotive. It will also be recognized that these trainlines are, in the standard industry practice, brought out to each end of each locomotive, so that in a consist of coupled locomotives, the trainlines can be joined by connectors which provide metal to metal contact of corresponding trainlines on adjacent coupled locomotives. It will also be recognized by a person skilled in the art that by means of these trainlines, one locomotive in the consist can be enabled to control the other locomotives.

A second narrower aspect the invention provides in addition to the above, a digital interface through which external digital equipment can made to effectively communicate with the central processor unit and a radio interface unit having two-way digital communication capability with the central processor unit. This system further includes a two-way radio having two-way communication capability with the radio interface unit and an external host.

Alternatively, in a third aspect, the present invention also provides a digital interface through which external digital equipment can communicate with the central processor unit and a first modulation/demodulation unit which processes digital signals received from the digital interface and produces a first modulated signal. The first modulation/demodulation unit also accepts a second modulated signal and produces therefrom digital signals for the central processor unit. Electric conduction lines are provided and are connected from railway car to railway car. Such electrical conduction lines carry the first and second modulated signals which are provided by a second modulation/demodulation unit, in an external host, which converts the first modulated signal into a digital signal for a digital computer in the external host and converts digital signals from the digital computer in the external host into the second modulated signal.

In a still more narrow fourth aspect of the invention, there is also provided means for controlling one or more slave locomotives which includes means for generating a first group of control signals in the lead locomotive. The first group of control signals being for control of the slave locomotive or locomotives. There is also a means provided for encoding such control signals in a digital form to obtain a second group of control signals and a means for transmitting the second group of control signals to a slave locomotive or locomotives. Additionally, a means in one or more slave locomotives is provided to receive the second group of control signals and generate a third group of control signals in digital format. The system further includes a throttle controller in slave locomotive, having a digital central processor unit and a digital interface which accepts the third group of control signals in digital format and generates a fourth group of control signals, having at least one analog signal, and a plurality of digital signals, and apply these signals to the trainlines which control the engine of said slave locomotive, or the engines of said slave locomotives.

OBJECTS OF THE INVENTION

It is therefore a primary object of this invention to provide a new and unique electronic apparatus and system that will enable control of the throttle, dynamic brake and reverser of one or more locomotives from a remote host, that is comparatively low in cost and more intelligent than prior art systems, and compact in volume.

Another object of this invention is to provide system for remote control of a locomotive's throttle, dynamic brake and reverser which can be achieved through either direct connection or via radio control.

A further object of this invention is to provide a remote control system for controlling throttle, dynamic brake and reverser in one or more slave locomotives in a train from the lead or control locomotive.

A still further object of this invention is to provide a remote control system for controlling throttle, dynamic brake and reverser in one or more slave locomotives in a train from the lead or control locomotive which includes two-way communication such that feed-back from a remotely controlled locomotive is provided to the lead or control locomotive.

BRIEF DESCRIPTION OF THE PRESENTLY PREFERRED AND VARIOUS ALTERNATIVE EMBODIMENTS OF THE INVENTION

Figure 1:
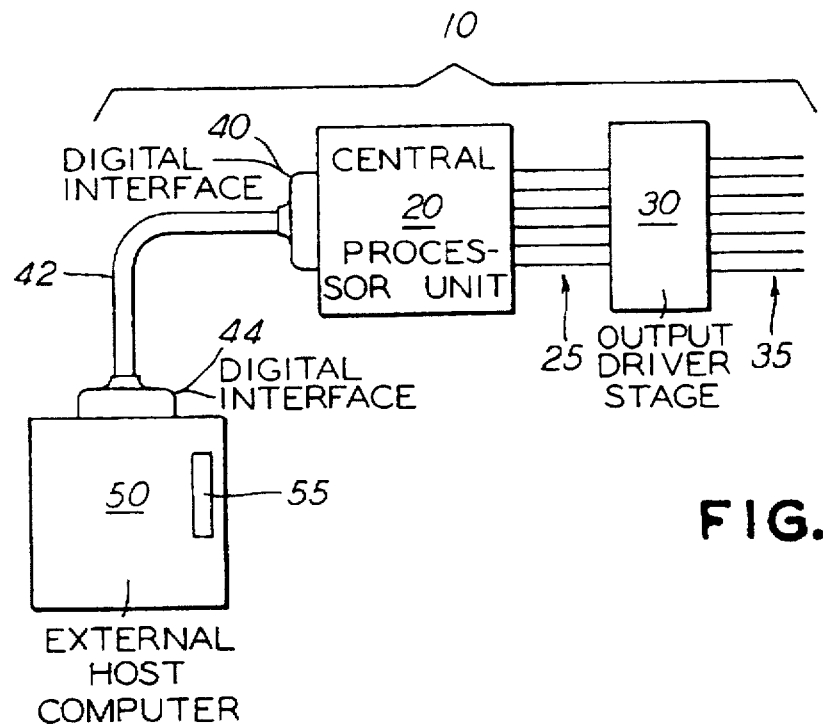
FIG. 1 is a block diagram of the most simple and basic embodiment of this invention.

Referring now to FIG. 1, the simplest and most basic embodiment of this invention is shown in block diagram. The throttle controller of a locomotive is indicated generally at 10. It includes a digital central processor computer 20, and an output driver stage at 30. The output driver stage, 30 drives high-voltage high power signals on the trainlines 35 which control the locomotive, and any other locomotives to which it is connected by trainlines. Two-way communication is provided between the central processor, 20 and the output driver, 30 through low-level signal lines, 25. A digital interface, 40 is provided on the central processor 20, which communicates through cable 42 to an external host computer 50 through digital interface 44. A joystick 55 may be provided on the external host computer 50, and with appropriate software, the joystick can control the locomotive.

This system provides for two-way flow of information from the external host computer 50 through the central processor 20 to the output driver stage 30. Hence, the locomotive can be controlled by signals originating in the external host computer, and diagnostic information indicative of voltages measured on trainlines 35 can be read back from the trainlines 35 through the output driver stage 30 and central processor 20 to the external host computer, 50. When a locomotive is operated in this manner, the locomotive is controlled by the external host computer, 50. The basic controls, the engine throttle setting, the reverser, and dynamic brake can all be controlled from the external host computer, 50. Signals from the operator's console of the locomotive (not shown), are overridden when operating in this mode. The digital interface 40, preferably connects to a wire communication link 42, either serial or parallel, but preferably serial, and more preferably, an RS-232 or an RS-422 serial, digital interface.

Apparatus and methods for transmitting measured values of trainline voltage back to central processor 20 are presented in U.S. Pat. Nos. 5,581,472 and 5,537,014, which were referenced above. These patents were filed concurrently with the present application and are assigned to the same assignee as the present application.

Figure 2:
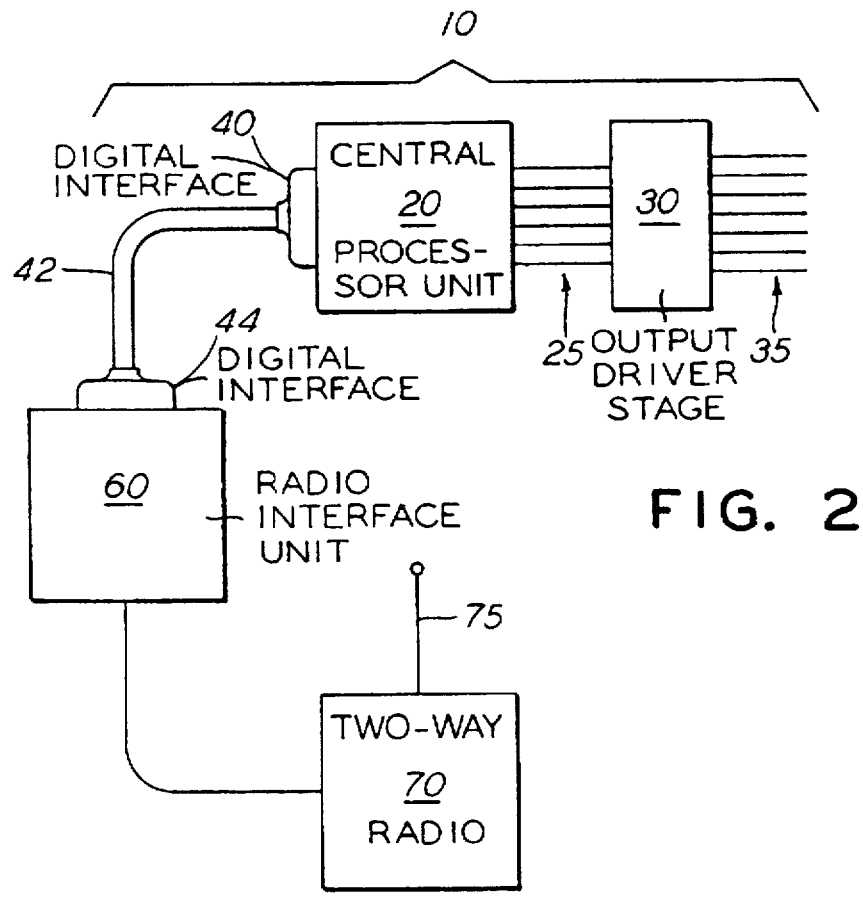
FIG. 2 is a block diagram substantially like that shown in FIG. 1 except that it includes a radio interface and a two-way radio.

Reference to FIG. 2 will illustrate another embodiment of this invention, which is similar to the embodiment disclosed above. As in FIG. 1, a central processor computer 20 communicates with an output driver stage 30 through lines carrying low-level signals, 25. The output driver stage 30 drives high-level signals on the trainlines, 35. Output driver stage 30 also sends diagnostic feedback signals indicative of measured voltages of trainlines 35 back to central processor computer 20 via low level signal lines 25. A digital interface, 40, a wire communication link 42 and digital communication interface, 44 provide two-way communication between the central processor 20 and a radio interface unit, 60. This is connected to a two-way radio 70 having antenna means 75, which communicates via radio signals with a remote host (not shown). For a transmitting function, the radio interface unit receives signals from the central processor 20 which include information indicative of measured voltages on trainlines 35 obtained via low level signals lines 25 from output driver stage 30 and converts these into a signal suitable to be modulated and broadcast by the radio 70. For a receiving function, the radio 70 receives signals from a remote host, demodulates the radio signal and sends a signal to the radio interface unit, 60. This converts the information received into digital information suitable to be sent to the central processor computer 20. This digital information is then used to control the locomotive through the output driver stage, 30 and the trainlines, 35.

Figure 3:
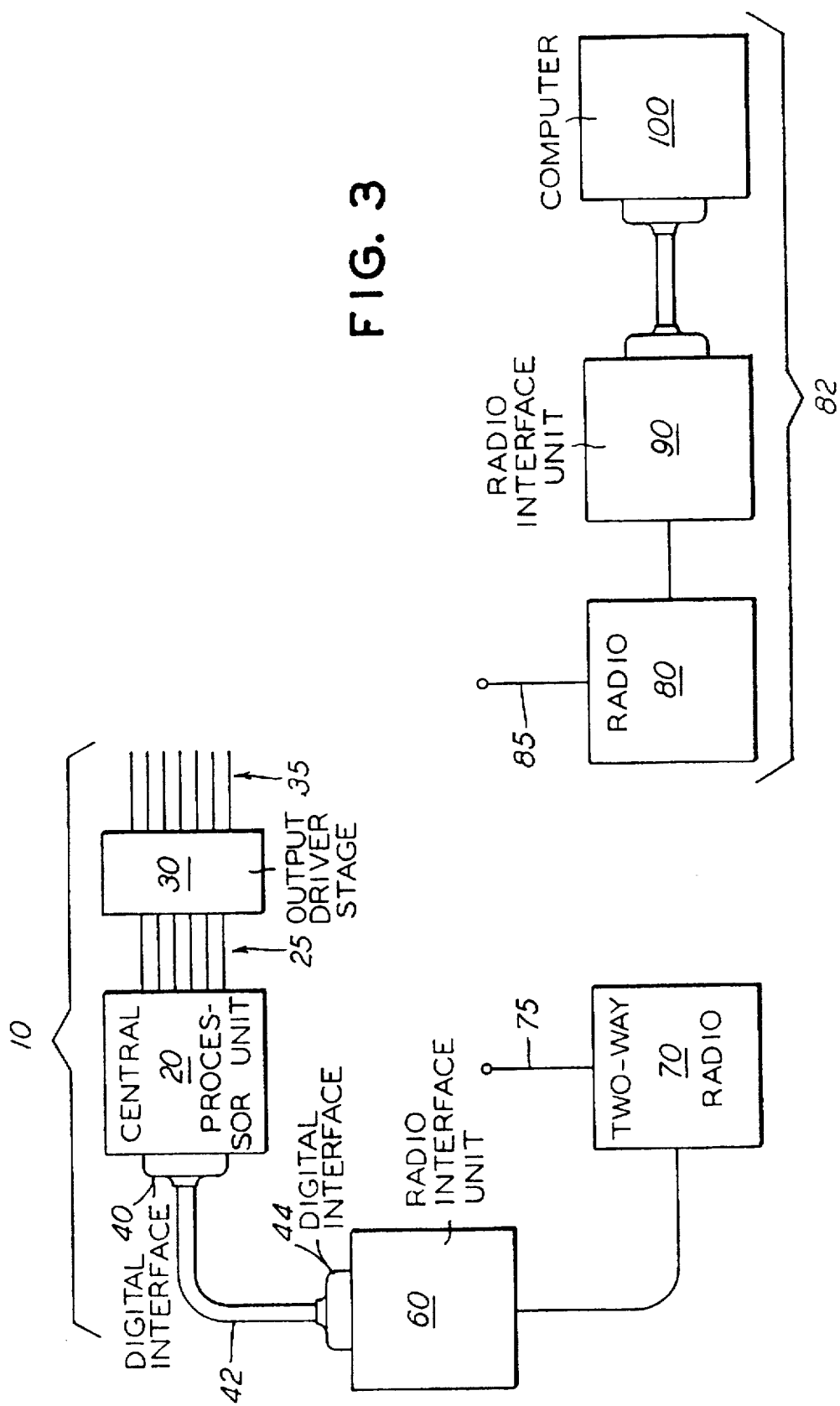
FIG. 3 is a block diagram substantially like that shown in FIG. 2 except that it includes a remote host computer, a radio interface for the remote host, and a radio for the remote host.

FIG. 3 shows the items shown in FIG. 2, with the addition of a remote host, shown generally as Item 82. The remote host 82 has a central processor computer 100, a radio interface unit 90 and a radio 80. Antenna means 85 are provided for two-way communication with the antenna means 75 and the radio 70 in the locomotive which is being controlled.

The remote host may be in a small unit which could be carried by a person, so that in a switchyard, a person on foot can control the locomotive. Likewise, the remote host may also be in a tower for control of trains in a switchyard. For RMU operation, in which the locomotive being controlled is some distance from the lead locomotive in a train, the remote host 82 would be located in the lead locomotive. For radio transmission to be effective, the slave locomotive, having radio 70 must be in the vicinity of the remote host which controls it. The term "in the vicinity" being interpreted to mean "within range for two-way radio communication".

Figure 4:
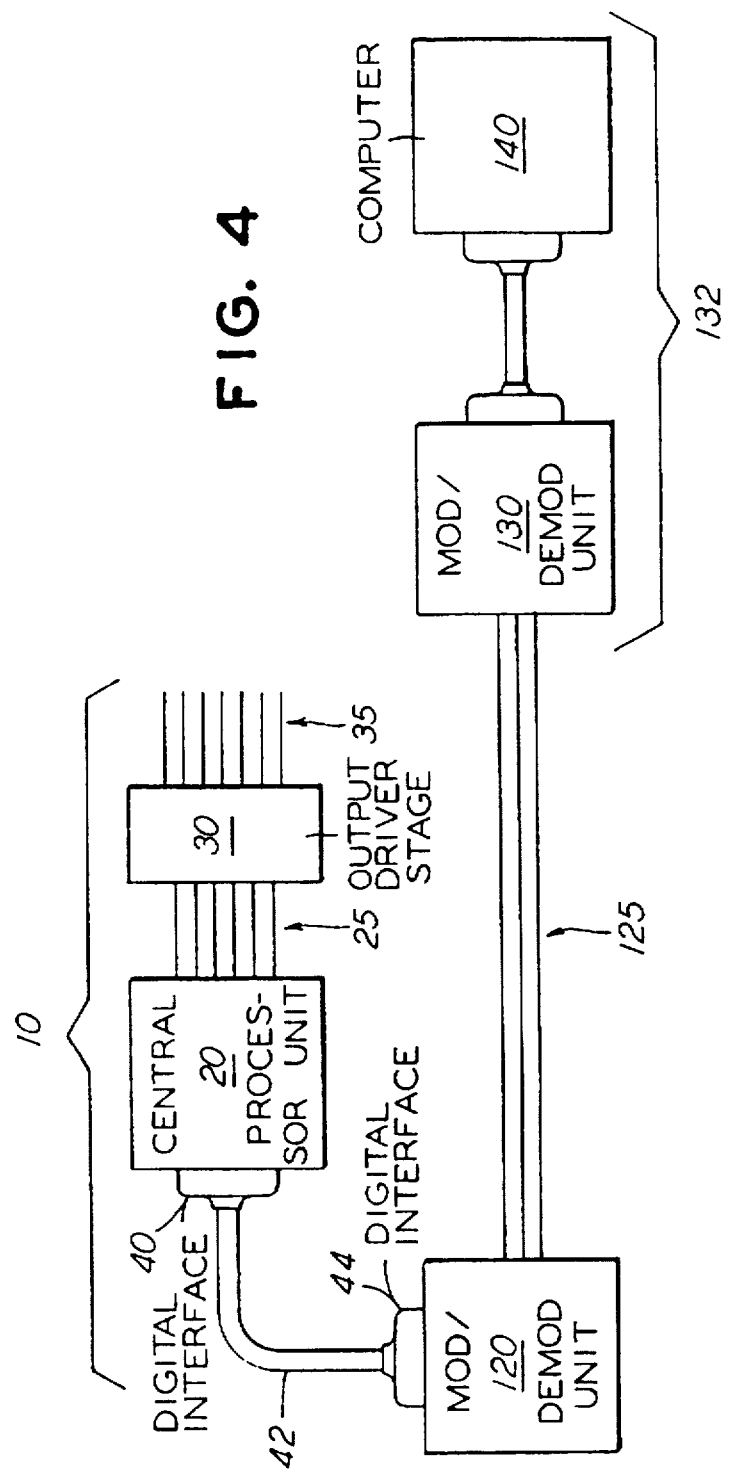
FIG. 4 is a block diagram substantially like that shown in FIG. 3 except that it represents an embodiment in which, for a train, there is a lead locomotive and a slave locomotive at some distance down the line of cars. Communication between the lead locomotive and the slave locomotive is accomplished by conduction paths which are connected from car to car down the train.

FIG. 4 shows an embodiment in which, for a train, there is a lead locomotive and a slave locomotive some distance down the line of cars. Communication between the lead locomotive and the slave locomotive is accomplished by conduction paths which are connected from car to car down the train. As in the preceding figures, 10 represents a throttle controller in the locomotive being controlled. It has a central processor 20 connected through digital means 40,42, and 44 to a unit for modulation and demodulation of digital signals from the central processor 20. The unit for modulation and demodulation is denoted as Item 120.

Conduction paths down the line of railway cars are indicated as 125, and 130 represents a modulation-demodulation unit in the host, generally indicated as 132, which has central processor 140.

The reason for the modulation-demodulation function is that it is not desirable to require that a large number of conduction paths be provided down the line of railway cars. For each of the modulation-demodulation units 120 and 130, communication with its associated computer is by a digital link. Communication between the modulation-demodulation units 120 and 130 is done by means of modulated signals requiring only a small number of conduction paths, denoted as Item 125.

We claim:

1. In a locomotive throttle controller having a digital central processor and an output driver for supplying an analog voltage signal to a trainline which controls dynamic braking and a plurality of digital voltage signals to trainlines which control locomotive power setting and reverser, such trainlines being industry standard locomotive trainlines which, when used in a consist of coupled locomotives, may be joined by metal to metal connections between adjacent locomotives, the improvement comprising:

(a) a digital interface through which external digital equipment can communicate with said central processor;

(b) means for communicating via said digital interface between said external digital equipment and said central processor such that said external digital equipment may be used to control at least said throttle setting, said reverser and said dynamic braking; and said external digital equipment including a digital computer connected to said throttle controller through said digital interface, so that at least said throttle setting, said reverser and said dynamic braking of said locomotive can be controlled by digital signals originating in said external computer, and so that diagnostic information from said central processor indicative of voltages measured on said trainlines can be accessed by said external computer.

2. The locomotive throttle controller, according to claim 1, wherein said digital interface is a communication link.

3. The locomotive throttle controller, according to claim 2, wherein said communication link is serial.

4. The locomotive throttle controller, according to claim 2, wherein said communication link is one of an RS-232 and an RS-422 digital interface.

5. The locomotive throttle controller, according to claim 4, wherein said communication link is an RS-232 digital interface.

6. The locomotive throttle controller, according to claim 1, wherein said external computer includes a joystick which can be used to control said locomotive.

7. A locomotive throttle controller according to claim 6 further including:

a radio interface unit having two-way digital communication with said central processor via said digital interface; and a two-way radio, in communication with said radio interface unit, for two-way communication with said external host whereby said external host may be used to control at least said throttle setting, said reverser and said dynamic braking of said locomotive and whereby said diagnostic information in said central processor can be accessed by said external host.

8. The locomotive throttle controller system, according to claim 7, wherein said external host comprises a two-way radio, a radio interface unit and a digital computer which can be carried by a person.

9. The locomotive throttle controller system, according to claim 7 wherein said external host comprises a two-way radio, a radio interface unit and a digital computer which can be located anywhere in the vicinity of said locomotive.

10. The locomotive throttle controller system, according to claim 9, wherein said external host is located in another locomotive.

11. In a locomotive throttle controller system having a digital central processor and an output driver for supplying an analog voltage signal to a trainline which controls dynamic braking and a plurality of digital voltage signals to trainlines which control locomotive power setting and reverser, such trainlines being industry standard locomotive trainlines which, when used in a consist of coupled locomotives, may be joined by metal to metal connections between adjacent locomotives, the improvement comprising:

(a) a digital interface through which an external digital equipment host can communicate with said central processor;

(b) a first modulation/demodulation unit which processes digital signals received from said digital interface and produces therefrom a first modulated signal, and also accepts a second modulated signal, originating in Item (d) below, and therefrom produces digital signals for communication to said central processor;

(c) electric conduction lines which are connected from railway car to railway car which carry said first and second modulated signals; and (d) a second modulation/demodulation unit in said external host which converts said first modulated signal into a digital signal for a digital computer in said external host, and converts digital signals from said digital computer in said external host into said second modulated signal such that said external host may be used to control at least said throttle setting, said reverser and said dynamic braking of said locomotive via said second modulated signal and such that diagnostic information from said central processor indicative of the voltages of said trainlines can be accessed by said external host via said first modulated signal.

12. The locomotive throttle controller system, according to claim 11, wherein said external host is located in another locomotive.

13. In a system for control of throttle, reverse, and dynamic braking in railway locomotives wherein there is a lead locomotive, and at some distance down the line of railway cars, at least one slave locomotive, the improvement comprising:

(a) means for generating a first group of control signals in said lead locomotive, said first group of control signals being for control of said slave locomotive;

(b) means for encoding said first group of control signals in a digital form to obtain a second group of control signals;

(c) means for transmitting said second group of control signals to said slave locomotive;

(d) means disposed in said slave locomotive to receive said second group of control signals and to generate a third group of control signals in digital format;

(e) a novel throttle controller in said slave locomotive, having a digital central processor computer and a digital interface which accepts said third group of control signals in digital format and generates a fourth group of control signals, having at least one analog signal for control of dynamic braking, and a plurality of digital voltage signals for locomotive throttle setting and reverser, said novel throttle controller having means to amplify said fourth group of control signals, and apply an analog signal to the trainline which controls the dynamic braking and the digital voltage signals to the trainlines which control the power setting and reverser of said slave locomotive;

(f) means disposed in said slave locomotive for generating a first set of diagnostic signals indicative of the measured voltages of said trainlines, said first set of diagnostic signals having at least one analog signal, and a plurality of digital signals;

(g) means disposed in said slave locomotive for encoding said first set of diagnostic signals to obtain a second set of diagnostic signals indicative of said measured voltages of said trainlines, said second set of diagnostic signals being in digital form; and (h) means for transmitting said second set of diagnostic signals back to said lead locomotive.

14. The system, according to claim 13, wherein said means for transmitting of Item (c) and Item (h) comprises a two-way digital radio link.

15. The system, according to Claim 13, wherein said means for transmitting of Item (c) and Item (h) comprises electrical conduction paths which are connected between said railway cars.

16. A method for controlling a railway locomotive which comprises:

(a) generating, in digital form, a first set of engine-control signals in an external host computer, said engine-control signals signals including signals indicative of throttle setting, reverser and dynamic braking;

(b) passing said first set of engine-control signals through a digital interface to a digital CPU of a locomotive throttle-control system to obtain a second set of engine-control signals;

(c) converting said second set of engine-control signals into a third set of engine-control signals including an analog voltage signal for control of dynamic braking and a plurality of digital voltage signals for control of locomotive throttle setting and reverser, said third set of engine-control signals being formatted for the trainlines of said locomotive;

(d) passing said third set of engine-control signals to an output driver where they are amplified and applied to the trainlines of said railway locomotive for control of said railway locomotive;

(e) sampling by said digital CPU the trainlines of said locomotive to obtain a first set of diagnostic signals indicative of an analog voltage measured on a trainline carrying said analog voltage signal for control of dynamic braking and said plurality of digital voltage signals for control of locomotive throttle setting and reverser;

(f) processing said first set of diagnostic signals to obtain a second set of diagnostic signals indicative of said measured voltages of said trainlines, said second set of diagnostic signals being in a form convenient to be sent back to said external host computer; and (g) passing said second set of diagnostic signals through said digital interface to said external host computer.

* * * * *